(12) United States Patent
Cope et al.

(10) Patent No.: US 10,378,895 B2
(45) Date of Patent: Aug. 13, 2019

(54) AERIAL SURVEY IMAGE CAPTURE SYSTEM

(71) Applicant: SPOOKFISH INNOVATIONS PTY LTD, Bentley, Western Australia (AU)

(72) Inventors: Simon Cope, Burswood (AU); Michael von Bertouch, Bicton (AU)

(73) Assignee: Spookfish Innovagtions PTY LTD, Bentley, Western Australia (AU)

( * ) Notice: Subject to any disclaimer, the term of this patent is extended or adjusted under 35 U.S.C. 154(b) by 137 days.

(21) Appl. No.: 15/503,998

(22) PCT Filed: Aug. 28, 2015

(86) PCT No.: PCT/AU2015/000528
§ 371 (c)(1),
(2) Date: Feb. 14, 2017

(87) PCT Pub. No.: WO2016/029253
PCT Pub. Date: Mar. 3, 2016

(65) Prior Publication Data
US 2017/0248421 A1   Aug. 31, 2017

(30) Foreign Application Priority Data
Aug. 29, 2014   (AU) ............................... 2014903450

(51) Int. Cl.
*G01C 11/02* (2006.01)
*G05D 1/00* (2006.01)
(Continued)

(52) U.S. Cl.
CPC .............. *G01C 11/02* (2013.01); *G01S 19/51* (2013.01); *G03B 15/006* (2013.01);
(Continued)

(58) Field of Classification Search
CPC .... G01C 11/02; G08G 5/0086; G08G 5/0021; G08G 5/045; G08G 5/0052; G06K 9/0063; G03B 15/006; G01S 19/51; G05D 1/0055
See application file for complete search history.

(56) References Cited

U.S. PATENT DOCUMENTS 4,818,990 A    4/1989 Fernandes
5,353,030 A *  10/1994 Koch ............... G01C 11/00
                                            342/169
(Continued)

OTHER PUBLICATIONS

Everaerts, "The Use of Unmanned Aerial Vehicles (UAVS) for Remote Sensing and Mapping," The International Archives of the Photogrammetry, Remote Sensing and Spatial Information Sciences, 2008, vol. XXXVII, part B1, pp. 1187-1192.
(Continued)

*Primary Examiner* — Howard D Brown, Jr.
(74) *Attorney, Agent, or Firm* — Dunlap Codding, P.C.

(57) ABSTRACT

An aerial survey image capture system for a survey aircraft is disclosed. The system comprises a camera system arranged to capture successive images of ground beneath a survey aircraft. The camera system has associated camera parameters, and a loss of separation (LOS) avoidance system for a survey aircraft. The LOS avoidance system is arranged to determine a predicted closest point of approach (CPA) distance between the survey aircraft and the nearby aircraft based on their locations and movements, compare the CPA distance with a defined minimum separation distance corresponding to a LOS, and determine an estimate for at least one navigation parameter of the survey aircraft required for the CPA distance to remain above the defined minimum separation distance. The system is further arranged to modify camera system parameters so as to at least partially compensate for a change in survey efficiency when the
(Continued)

estimated at least one navigation parameter is used to navigate the survey aircraft.

22 Claims, 5 Drawing Sheets

(51) Int. Cl.
| | | |
|---|---|---|
| *G01S 19/51* | (2010.01) | |
| *G08G 5/00* | (2006.01) | |
| *G08G 5/04* | (2006.01) | |
| *G03B 15/00* | (2006.01) | |
| *G06K 9/00* | (2006.01) | |

(52) U.S. Cl.
CPC ......... *G05D 1/0055* (2013.01); *G06K 9/0063* (2013.01); *G08G 5/0021* (2013.01); *G08G 5/0052* (2013.01); *G08G 5/0086* (2013.01); *G08G 5/045* (2013.01)

(56) References Cited

U.S. PATENT DOCUMENTS

| | | | |
|---|---|---|---|
| 5,581,250 | A | 12/1996 | Khvilivitzky |
| 5,844,602 | A | 12/1998 | Lareau et al. |
| 5,999,211 | A | 12/1999 | Hedges et al. |
| 6,130,705 | A | 10/2000 | Lareau et al. |
| 7,424,133 | B2 | 9/2008 | Schultz et al. |
| 7,969,346 | B2 | 6/2011 | Franceschini et al. |
| 8,818,572 | B1 | 8/2014 | Tofte et al. |
| 9,609,288 | B1* | 3/2017 | Richman ................ H04N 7/183 |
| 9,612,598 | B2* | 4/2017 | Schultz ................ B64D 47/08 |
| 2010/0100269 | A1 | 4/2010 | Ekhaguere et al. |
| 2010/0121574 | A1 | 5/2010 | Ariyur et al. |
| 2010/0204867 | A1 | 8/2010 | Longstaff |
| 2010/0256909 | A1 | 10/2010 | Duggan et al. |
| 2010/0283853 | A1* | 11/2010 | Acree ................ G01C 11/00 348/144 |
| 2010/0286859 | A1 | 11/2010 | Feigh et al. |
| 2011/0288773 | A1 | 11/2011 | Hoy |
| 2012/0062730 | A1 | 3/2012 | Férrano et al. |
| 2012/0209457 | A1 | 8/2012 | Bushnell |
| 2013/0135440 | A1 | 5/2013 | Ohtomo et al. |
| 2014/0146173 | A1* | 5/2014 | Joyce ................ G01C 11/04 348/144 |
| 2014/0168420 | A1 | 6/2014 | Naderhirn et al. |
| 2015/0022656 | A1* | 1/2015 | Carr ................ G06K 9/0063 348/117 |
| 2015/0185006 | A1* | 7/2015 | Baryshnikov .......... G03B 37/04 348/144 |
| 2015/0226575 | A1* | 8/2015 | Rambo ................ B64C 39/024 701/523 |
| 2016/0229555 | A1* | 8/2016 | Millin .................... G06T 3/4038 |
| 2016/0306824 | A1* | 10/2016 | Lopez ................... G06T 3/4092 |
| 2017/0195569 | A1* | 7/2017 | Lapstun ................ B64D 47/08 |
| 2017/0235018 | A1 | 8/2017 | Foster et al. |

OTHER PUBLICATIONS

Pereira et al., "Unmanned Air Vehicles for coastal and environmental research," Journal of Coastal Research, 2009, Special Issue 56.
International Search Report dated Oct. 20, 2015 in International Application No. PCT/AU2015/000528, filed Aug. 28, 2015, in 3 pages.
International Preliminary Report on Patentability dated Dec. 19, 2016 in International Application No. PCT/AU2015/000528, filed Aug. 28, 2015, in 6 pages.
Farrell, J. L., "Collision Avoidance by Speed Change", International Journal of Unmanned Systems Engineering (IJUSEng), vol. 1, No. 1, pp. 1-8, 2013.
Martel, F. et al., "Unmanned Aircraft Systems Sense and Avoid Avionics Utilizing ADS-B Transceiver", AIAA Infotech@Aerospace Conference, Apr. 6-9, 2009.
Peng, L. et al., "A Closed-Form Solution of Horizontal Maneuver to Collision Avoidance System for UAVs", Chinese Control and Decision Conference (CCDC), pp. 4416-4421, May 26-28, 2010.
Extended European Search Report dated Aug. 9, 2017 for European Application No. 15836009.9 filed Aug. 28, 2015.
International-Type Search Report dated Jul. 17, 2015 for National Application No. 2014903450 filed Aug. 29, 2014.
ForeFlight traffic tips—how to get the most out of ADS-B traffic, IPad Pilot News. Oct. 22, 2015 (in 9 pages).
Kuchar et al. The Traffic Alert and Collision Avoidance System, Lincoln Laboratory Journal, vol. 16, No. 2, 2007, pp. 277-296.

* cited by examiner

AERIAL SURVEY IMAGE CAPTURE SYSTEM

FIELD OF THE INVENTION

The present invention relates to an aerial survey image capture system for a survey aircraft.

BACKGROUND OF THE INVENTION

A survey aircraft typically includes an aerial camera system that is arranged to capture ground images. Typically, the aerial camera system is mounted to an underside portion of the survey aircraft and ground images are captured as the survey aircraft moves along defined flight lines. The system is arranged to capture multiple images for each ground feature, which enables a photogrammetric solution, such as a bundle adjustment process, to be applied to the captured images in order to determine a best case solution for interior and exterior orientation information associated with each camera used and the images captured by each camera. The solution produced by the bundle adjustment process may then be used for further processing, such as 3D reconstruction, and to produce output product such as nadir and/or oblique photomaps and elevation datasets.

In order to improve the photogrammetric solution produced by the bundle adjustment process, the number of images taken for each ground feature must be increased, and typically this is achieved by capturing images more frequently so that the overlap between successively captured images is increased, by ensuring that sufficient overlap exists between adjacent flight lines, and by ensuring that images are taken from appropriate angles for each point on the ground.

In order to produce a good photogrammetric solution, a redundancy of about 10 is generally required, but with a relatively long associated focal length for each image and relatively large image overlaps, the ratio of distance between camera locations at image capture and distance to target (the 'base-to-height' ratio) is relatively small, which affects accuracy of the photogrammetric solution.

Productivity of an aerial camera system is determined according to the amount of ground area captured per hour at a given resolution. Therefore, since flying costs are primarily determined on an hourly rate, if a system captures more ground area per hour, then the cost per unit area decreases. Additionally, it is desirable to only capture the minimum amount of data required for a given area for it to be processed to the desired accuracy and output product requirements.

All aircraft operating in controlled airspace under Instrument Flight Rules are required to maintain a minimum separation from other aircraft at all times. This is accomplished by air traffic controllers monitoring position and velocity of all aircraft in the controlled airspace and providing directions to aircraft to ensure adequate separation for safe flight.

Airspace management jurisdictions around the world require that two separation conditions are achieved:
1. horizontal separation minima for aircraft flying at the same or similar altitude; and
2. vertical separation minima for aircraft at the same or similar latitude and longitude.

Air traffic controllers apply separation standards to keep aircraft operating in controlled airspace and at airports with an operational control tower a minimum distance apart.

When two aircraft are separated by a distance that is less than a minimum separation distance defined by airspace classification, a loss of separation (LOS) situation is considered to exist, and air traffic controllers are prompted to intervene to instruct the pilots of one or both of the aircraft to take positive evasive action. A LOS does not necessarily mean that the two aircraft involved were at actual risk of colliding, rather that separation standards according to the relevant airspace classification were not maintained.

The parameters that may be changed to provide adequate separation between aircraft on converging flight paths include course, speed or altitude and changes to one or more of these parameters may be made to either or both aircraft.

Aerial survey aircraft are required to fly along predetermined flight lines which are generally parallel and at a fixed spacing. Minor deviations from the defined flight lines can be tolerated and image acquisition can continue. However, substantial deviation vertically or horizontally from the defined flight lines requires image acquisition to be suspended. The image acquisition can only recommence when the aircraft returns to the interrupted flight line at the location where the image acquisition was previously suspended.

Regularly Scheduled Passenger Transport (RPT) aircraft in most airspace jurisdictions have priority over other civilian aircraft when air traffic controllers make a decision about which of two aircraft on a converging flight path is to be diverted. Survey aircraft generally have the lowest priority compared to other airspace users. As a consequence, survey aircraft operating in controlled airspace will have a much greater likelihood of deviation from the respective planned flight lines than other air traffic.

However, deviation of a survey aircraft from planned flight lines causes significant loss of survey productivity because survey time is lost between suspension and recommencement of a survey flight and because of additional fuel required.

SUMMARY OF THE INVENTION

In the present specification, it will be understood that the 'closest point of approach' (CPA) is a distance value indicative of the predicted minimum distance between two aircraft as the aircraft move relative to each other. The CPA value is indicative of the risk of a collision between the two aircraft.

It will also be understood that in the present specification the 'minimum separation distance' is the distance defined by airspace classification between two aircraft at which a Loss of Separation (LOS) situation exists, and air traffic control is required to intervene to provide directions to one or both of the aircraft to make a change to the direction of travel.

In accordance with a first aspect of the present invention, there is provided an aerial survey image capture system for a survey aircraft navigable using navigation parameters that include altitude, speed and direction, the system comprising:
  a camera system arranged to capture successive images of ground beneath a survey aircraft as the survey aircraft travels on a defined flight path;
  the camera system having associated camera parameters indicative of image capture characteristics of the camera system including defined image overlap between captured images;
  the defined flight path and the camera parameters being such that sufficient multiple images are obtained of ground features that a bundle adjustment process can be carried out on the ground images and a photogrammetric solution produced based on the images;

the aerial survey image capture system comprising:
a loss of separation (LOS) avoidance system for a survey aircraft;
the LOS avoidance system arranged to:
receive information indicative of the location and movement of the survey aircraft and to receive information indicative of the location and movement of a nearby aircraft in the vicinity of the survey aircraft;
determine a predicted closest point of approach (CPA) distance between the survey aircraft and the nearby aircraft based on the received information indicative of the location and movement of the survey aircraft and the information indicative of the location and movement of the nearby aircraft;
compare the CPA distance with a defined minimum separation distance corresponding to a loss of separation (LOS); and
determine an estimate for at least one navigation parameter of the survey aircraft that is required for the CPA distance to remain above the defined minimum separation distance; and
a camera parameter modifier arranged to produce modified camera system parameters in response to the estimated at least one navigation parameter, the modified camera system parameters modifying characteristics of image capture by the camera system so as to substantially maintain the defined image overlap between captured images and thereby at least partially compensate for a change in survey efficiency when the estimated at least one navigation parameter is used to navigate the survey aircraft without modifying the defined flight path.

In an embodiment, the camera parameter modifier comprises an image capture controller arranged to control the rate of image capture by the camera system so as to at least partially compensate for a change in survey efficiency when the estimated at least one navigation parameter is used to navigate the survey aircraft.

The image capture controller may be arranged to increase or reduce the rate of image capture by the camera system so as to at least partially compensate for a change in survey efficiency when the estimated at least one navigation parameter is used to navigate the survey aircraft.

The image capture controller may be arranged to increase or reduce the rate of image capture by the camera system so as to modify the amount of overlap between adjacent captured images when the estimated at least one navigation parameter is used to navigate the survey aircraft.

In an embodiment, the system comprises an image capture rate calculator arranged to calculate the image capture rate required in order to at least partially compensate for a change in survey efficiency when the estimated at least one navigation parameter is used to navigate the survey aircraft, the image capture rate calculator arranged to provide the image capture controller with the calculated required image capture rate.

In an embodiment, the image capture rate calculator is arranged to calculate the image capture rate using the following formula:

$$Tcycle = 2*TAN\left(\frac{FoV}{2}\right)*A*\frac{1-O}{V}$$

where $T_{cycle}$ is the image capture rate in seconds, FoV is the along track field of view of an image footprint in degrees, A is the altitude of the survey aircraft in metres, and O is the forward overlap (%) of adjacent captured images.

In an embodiment, the camera parameter modifier comprises a camera movement controller arranged to control movement characteristics of the camera system so as to at least partially compensate for a change in survey efficiency when the estimated at least one navigation parameter is used to navigate the survey aircraft.

In an embodiment, the camera system includes a camera assembly arranged to sweep as images are captured, and the camera movement controller is arranged to increase or reduce the rate of sweep or the range of sweep of the camera assembly so as to modify the amount of overlap between adjacent captured images when the estimated at least one navigation parameter is used to navigate the survey aircraft.

The camera movement controller may be arranged to control movement characteristics of the camera system so as to at least partially compensate for a change in survey efficiency when the estimated at least one navigation parameter is used to navigate the survey aircraft and the image capture rate calculated by the image capture rate calculator is at or above the maximum image capture rate of the camera system.

In an embodiment, the system comprises an ADS-B data receiving device arranged to receive information indicative of the location and movement of nearby aircraft in the vicinity of the survey aircraft. The ADS-B data receiving device may be located on the survey aircraft or at a ground location in the vicinity of the survey aircraft.

In an embodiment, the system comprises a GPS device located on the survey aircraft, the system arranged to use the GPS device to produce information indicative of the location and movement of the survey aircraft.

In an embodiment, the estimate for the at least one navigation parameter of the survey aircraft that is required for the CPA distance to remain above the defined minimum separation distance is determined at a ground location and wirelessly communicated to the survey aircraft.

In an embodiment, the information indicative of the location and movement of the survey aircraft includes altitude, speed, position and bearing information.

In an embodiment, the information indicative of the location and movement of the nearby aircraft includes altitude, speed, position and bearing information.

In an embodiment, the system is arranged to calculate the time to the closest point of approach (CPA) distance based on the information indicative of the location and movement of the nearby aircraft and the information indicative of the location and movement of the survey aircraft.

In an embodiment, the system is arranged to calculate the closest point of approach (CPA) distance using the calculated time to the closest point of approach (CPA) distance.

In an embodiment, the system is arranged to display on the survey aircraft the at least one navigation parameter of the survey aircraft that is required for the CPA distance to remain above the defined minimum separation distance.

In an embodiment, the system is arranged to produce audible information indicative of the at least one navigation parameter of the survey aircraft that is required for the CPA distance to remain above the defined minimum separation distance.

In an embodiment, the at least one navigation parameter includes speed of travel of the survey aircraft.

In an embodiment, the at least one navigation parameter includes altitude of the survey aircraft.

In an embodiment, the at least one navigation parameter includes course of the survey aircraft.

In an embodiment, the system is arranged to determine whether the survey aircraft and the nearby aircraft are at different altitudes converging towards the same altitude, and if so, the system is arranged to calculate the predicted altitudes of the survey aircraft and the nearby aircraft at the CPA distance.

In an embodiment, if the altitude of the survey aircraft at the CPA distance and the altitude of the nearby aircraft at the CPA distance are not substantially the same, the system is arranged such that an estimate for the speed and/or direction of travel of the survey aircraft is not determined.

In accordance with a second aspect of the present invention, there is provided a method of capturing aerial survey images in a survey aircraft navigable using navigation parameters that include altitude, speed and direction, the method comprising:

capturing successive images of ground beneath a survey aircraft as the survey aircraft travels on a defined flight path using a camera system, the camera system having associated camera parameters indicative of image capture characteristics of the camera system including defined image overlap between captured images;

receiving information indicative of the location and movement of the survey aircraft;

receiving information indicative of the location and movement of a nearby aircraft in the vicinity of the survey aircraft;

determining a predicted closest point of approach (CPA) distance between the survey aircraft and the nearby aircraft based on the received information indicative of the location and movement of the survey aircraft and the information indicative of the location and movement of the nearby aircraft;

comparing the CPA distance with a defined minimum separation distance corresponding to a loss of separation (LOS);

if the CPA distance is less than the defined minimum separation distance, determining an estimate for at least one navigation parameter of the survey aircraft that is required for the CPA distance to remain above the defined minimum separation distance;

producing modified camera system parameters in response to the estimated at least one navigation parameter, the modified camera system parameters modifying characteristics of image capture by the camera system so as to substantially maintain the defined image overlap between captured images and thereby at least partially compensate for a change in survey efficiency when the estimated at least one navigation parameter is used to navigate the survey aircraft.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Automatic Dependent Surveillance—Broadcast (ADS-B) is a cooperative surveillance technology whereby an aircraft determines its position using satellite navigation techniques and periodically broadcasts the position information. The information can be received by air traffic control ground stations as a replacement or supplement for secondary radar. The position information can also be received by other aircraft to provide situational awareness and allow operators of the other aircraft to self-manage the separation distance between the two aircraft.

The present system uses an ADS-B data receiving device, for example disposed on a survey aircraft, to monitor the identity, position, speed, heading, altitude and rate of climb/descent of all aircraft within the proximity of the survey aircraft, determines whether any of the nearby aircraft are converging with the survey aircraft, and predicts the closest point of approach (CPA) between the survey aircraft and the nearby aircraft. If there is a potential loss of separation (LOS) situation, the system estimates the change in survey aircraft speed required to ensure the required minimum separation between the aircraft is achieved, and displays or otherwise communicates the estimated speed to aircraft operators.

In a variation of the system, instead of calculating and displaying to an aircraft operator the change in survey aircraft speed required to maintain a minimum separation distance between the survey aircraft, the system may calculate and display a change in altitude that is required in order to maintain the minimum separation distance.

It will be understood that monitoring of ADS-B data and calculation of speed changes can occur in the survey aircraft, or at a ground-based station and the results produced at the ground-based station transmitted to the aircraft.

Additionally, or alternatively, any other traffic databases that provide additional information about aircraft flight destinations, such as airline schedules, may be additionally used to predict intended changes to flight paths.

The system is also arranged to automatically modify camera parameters, such as image capture parameters and/or camera assembly movement parameters in response to a change in survey aircraft navigation parameters so that a significant change in survey efficiency is avoided.

Changes in survey aircraft navigation parameters in order to avoid a LOS situation can affect survey efficiency, for example in terms of quality of images produced during a survey and/or a reduction in image processing capability or efficiency.

For example, if an aircraft operator changes the speed of a survey aircraft with no change to the timing of image capture, the overlap amount between adjacent captured images in a direction parallel to the direction of travel of the survey aircraft will change. An increase in survey aircraft speed will result in a decrease in image overlap, while a decrease in survey aircraft speed will result in an increase in image overlap. This has a significant impact on image processing, in particular calculation of a photogrammetric solution, such as a bundle adjustment process, because a particular amount of overlap between adjacent images is required in order to obtain a best case solution for interior and exterior orientation information associated with each camera used and the images captured by each camera.

In order to at least partially compensate for changes in image overlap caused by changes in aircraft speed, the system may be arranged to automatically modify the speed of image capture. For example, if the speed of the aircraft is reduced to avoid a LOS situation, the amount of overlap between adjacent images will increase. In response, the system may be arranged to automatically increase the time between capture of successive images in order to compensate for this and thereby reduce the overlap between adjacent captured images.

Alternatively, in a survey aircraft that includes a camera assembly that sweeps laterally in order to capture more images across a direction generally perpendicular to the direction of travel of the survey aircraft, at least partial compensation for a change in image overlap can be achieved by changing the scanning cycle time of the camera assembly. For example, the speed of rotation of the camera assembly or the maximum range of the scanning sweep may be changed.

The important aspect is that a modification is automatically made to camera parameters, such as the timing of image capture or the movement characteristics of the camera assembly, in order to at least partially compensate for changes in image capture characteristics due to changes in navigation parameters, such as aircraft speed, altitude or direction of travel.

Figure 1:
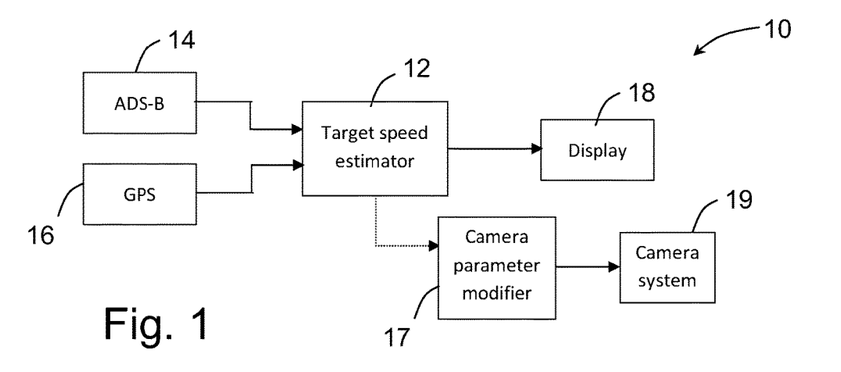
FIG. 1 is a block diagram representing an aerial survey image capture system in accordance with an embodiment of the present invention.

Referring to the drawings, FIG. 1 shows an aerial survey image capture system 10, in this example located on a survey aircraft.

The system 10 includes an aircraft navigation parameter estimator, in this example a target speed estimator 12, arranged to calculate a target survey aircraft speed indicative of a survey aircraft speed at which the minimum separation distance will be maintained. The target speed is calculated using location and movement data indicative of the locations and movements of nearby aircraft obtained from an automatic dependent surveillance-broadcast (ADS-B) data receiving device 14, and location and movement data indicative of the location and movement of the survey aircraft obtained from a GPS device 16 on the survey aircraft. The calculated target speed is presented to an aircraft operator on a display 18, but may be communicated to the aircraft operator orally, or directly input to the aircraft so as to automatically change the speed of the aircraft.

The calculated speed is also provided to a camera parameter modifier 17 that determines a camera system modification to be made to the camera system 19, such as the timing of image capture or the movement characteristics of a camera assembly of the camera system, in order to at least partially compensate for changes in image capture characteristics due to changes in navigation parameters, such as aircraft speed, altitude or direction of travel. The determined camera system modification determined by the camera parameter modifier 17 is used by the camera system 19 to modify one or more parameters of camera system operation, such as timing of image capture, or camera assembly movement characteristics. For example, in an arrangement wherein the camera system is arranged to sweep transversely as images are captured, the sweep speed or sweep range of the camera assembly may be modified.

It will be understood that instead of using the target survey aircraft speed calculated by the target speed estimator 12 to determine the camera system modification, the actual speed change made to the aircraft may be used, because the speed change actually made to the aircraft may differ from the aircraft speed change suggested by the target speed estimator 12.

Figure 2:
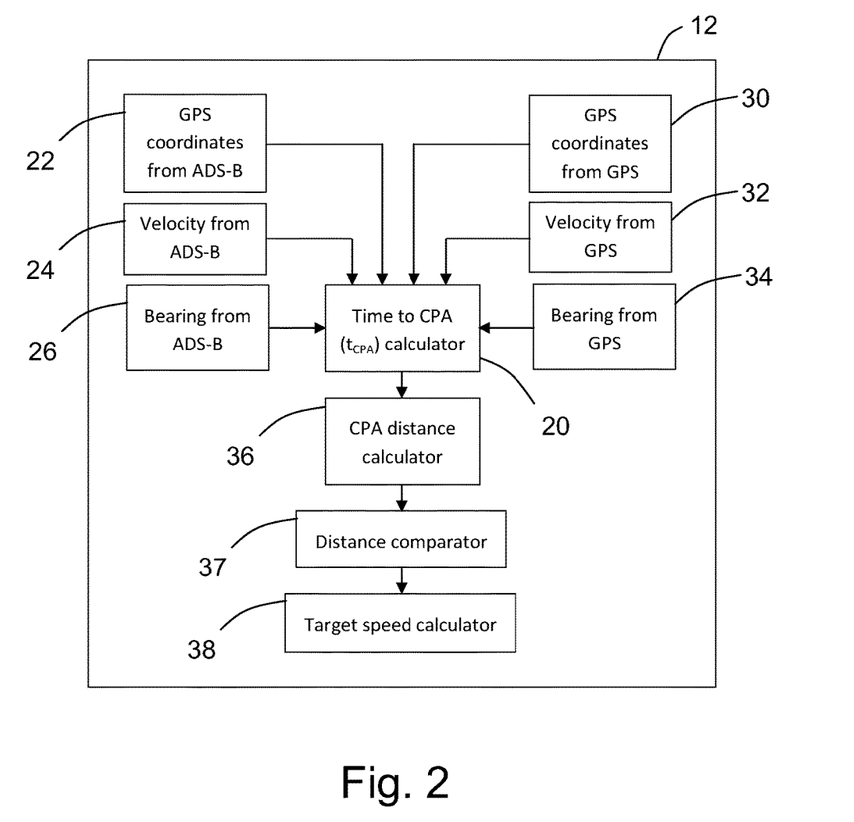
FIG. 2 is a block diagram representing a target speed estimator of the system shown in FIG. 1.

The target speed estimator 12 is shown in more detail in FIG. 2 and includes a time to CPA ($t_{CPA}$) calculator 20 arranged to calculate the estimated time to the CPA distance based on the location and movement data from the ADS-B data receiving device 14 and the GPS device 16. In this example, the location and movement data from the ADS-B device 14 includes GPS coordinates 22 of nearby aircraft, velocity values 24 for nearby aircraft and bearing values 26 for nearby aircraft. Similarly, the location and movement data from the GPS device 16 includes GPS coordinates 30 of the survey aircraft, a velocity value 32 of the survey aircraft and a bearing value 34 for the survey aircraft.

The target speed estimator 12 also includes a CPA distance calculator 36 arranged to calculate the CPA distance using the calculated time to CPA ($t_{CPA}$), and a distance comparator 37 arranged to compare the CPA distance to the minimum separation distance. If the CPA distance is greater than the minimum separation distance, then the nearby aircraft is ignored.

The target speed estimator 12 also includes a target speed calculator 38 arranged to calculate an estimate of the speed at which the survey aircraft should fly in order to maintain the CPA distance above the minimum separation distance and thereby avoid a LOS situation. The target speed calculator 38 calculates a speed estimate when the CPA distance is less than or approximately equal to the minimum separation distance.

While in this example the aircraft navigation parameter estimator calculates navigation parameters, in the present embodiment an estimated aircraft speed, in order to avoid a LOS situation, the aircraft navigation parameter estimator may also take into consideration survey efficiency in terms of image capture and subsequent image processing, and also survey efficiency in terms of fuel used.

Figure 3:
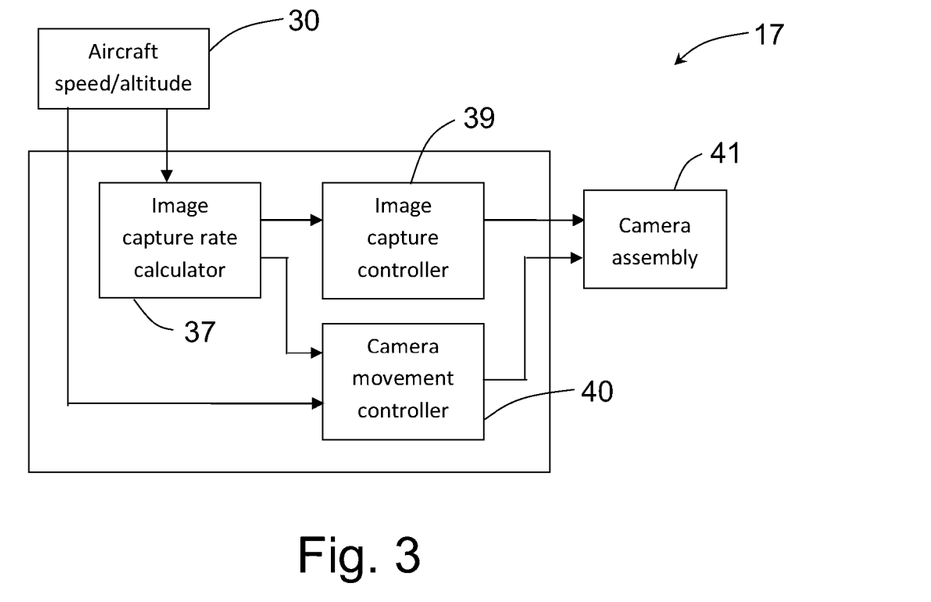
FIG. 3 is a block diagram representing features of a camera parameter modifier responsive to a change in aircraft navigation parameters.

An example camera parameter modifier 17 is shown in more detail in FIG. 3 and includes an image capture rate calculator 37 arranged to calculate the image capture rate required in order to maintain the image overlap between adjacent captured images in a direction parallel to the direction of aircraft travel substantially constant as the speed of the aircraft changes. The camera parameter modifier 17 also includes an image capture controller 39 that responds to the calculated image capture rate and produces control signals for the camera assembly 41 to control the timing of image capture by cameras of the camera assembly 41.

In this example, the camera parameter modifier 17 also includes a camera movement controller 40 that responds to the calculated image capture rate and/or a change in speed and/or altitude 30 and produces control signals for the camera assembly 41 to control other parameters of the camera assembly, in this example movement parameters of cameras of the camera assembly 41.

In a system that includes an image capture rate calculator 37 and an image capture controller 39 arranged to control the timing of image capture by cameras of the camera assembly 41, if the calculated image capture rate is higher than the camera assembly is able to accommodate, then one or more alternative parameters of the camera assembly may be modified, for example using the camera movement controller 40. In an example that includes a camera assembly 41 arranged to sweep transversely as images are captured, the camera movement controller 40 is arranged to respond to the calculated image capture rate and produce control signals to control the sweep speed or sweep range of the camera assembly 41.

However, while the camera parameter modifier 17 in this example includes functionality for modifying the image capture rate or movement parameters of cameras of the camera system, it will be appreciated that the camera parameter modifier 17 may include functionality associated with any other parameter of the camera system that affects survey efficiency in terms of image capture and/or image processing is envisaged.

Figure 4:
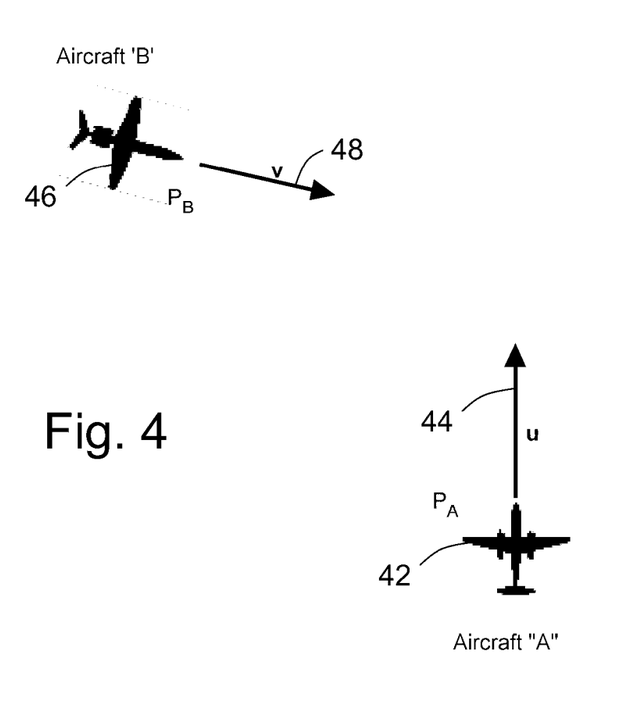
FIG. 4 is a diagrammatic representation illustrating respective flight directions of a survey aircraft and an aircraft located in the vicinity of the survey aircraft.
Figure 5:
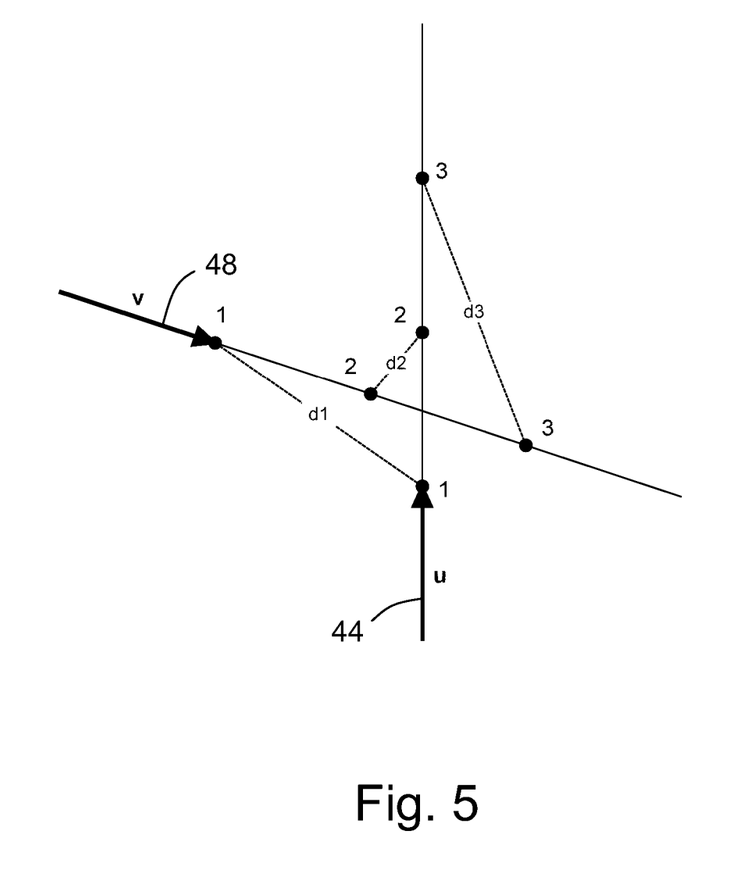
FIG. 5 is a diagrammatic representation illustrating respective flight paths of a survey aircraft and an aircraft located in the vicinity of the survey aircraft and distances between the aircraft at different times.

Referring to FIGS. 4 and 5, an example is shown of a survey aircraft 42 travelling in a direction indicated by arrow 44, and a nearby aircraft 46 travelling in a different direction indicated by arrow 48. The speed of the survey aircraft is u, the speed of the nearby aircraft is v, the position vector of the survey aircraft is $P_A$ and the position vector of the nearby aircraft is $P_B$.

As shown more particularly in FIG. 5, the separation distance between the survey aircraft 42 and the nearby aircraft 46 is d and three values for the separation distance d1, d2 and d3 are shown at different times.

If the separation distance d is at any time less than the prescribed minimum separation distance according to the relevant airspace classification, then a LOS situation exists and air traffic controllers will intervene and direct one or both pilots to change course.

An example method of calculating the target speed at which the survey aircraft should fly in order to maintain the separation distance above the minimum separation distance and thereby avoid a LOS situation is described below. However, it will be understood that any suitable calculation method is envisaged.

For each ADS-B transmission received by the survey aircraft from other aircraft in the vicinity of the survey aircraft, the target speed estimator 12 determines the speed required by the survey aircraft in order to avoid a potential loss of separation (LOS) situation.

The time to CPA calculator 20 determines the amount of time ($t_{CPA}$) to the CPA distance, in this example using the following methodology.

The latitude & longitude coordinates ($LL_A$) of the survey aircraft 42 and the latitude & longitude coordinates ($LL_B$) of the nearby aircraft 46 are provided respectively by the GPS device 16 and the ADS-B data receiving device 14. In the present example, the latitude & longitude coordinates are:

$$LL_A := \begin{pmatrix} -34.719 \text{ deg} \\ 149.469 \text{ deg} \end{pmatrix}$$

$$LL_B := \begin{pmatrix} -34.324 \text{ deg} \\ 147.794 \text{ deg} \end{pmatrix}$$

The GPS device 16 and the ADS-B data receiving device 14 also respectively provide the altitude ($A_A$), heading ($\phi_A$) and speed ($V_A$) of the survey aircraft and the altitude ($A_B$), heading ($\phi_B$) and speed ($V_B$) of the nearby aircraft. In the present example, the altitudes, headings & speeds are:

$A_A := 30200$ ft
$A_B := 31000$ ft
$\phi_A := 350$ deg
$\phi_B := 71$ deg
$V_A := 220$ kts
$V_B := 450$ kts The survey aircraft 42 is used as the coordinate reference frame origin (north up), and therefore its position vector is:

$$P_A := \begin{pmatrix} 0 \text{ NM} \\ 0 \text{ NM} \end{pmatrix}$$

The relative initial position of the nearby aircraft 46 can be calculated using a simple equi-rectangular projection, since errors are small given the relatively small distance compared to the curvature of the earth. The altitude is assumed to be at sea level (6371 km absolute Earth centric) because the effect of altitude on the calculation is negligible relative to the accuracy required. The relative initial position of the nearby aircraft 46 is given by:

$$P_B := \begin{bmatrix} (LL_{B_1} - LL_{A_1}) \cdot \cos(LL_{A_0}) \cdot 6371 \text{ km} \\ (LL_{B_0} - LL_{A_0}) \cdot 6371 \text{ km} \end{bmatrix}$$

which for the latitude & longitude coordinates for the nearby plane provided above gives:

$$P_B \begin{pmatrix} -82.662 \\ 23.716 \end{pmatrix} \text{NM}$$

Converting velocity magnitude and bearing values to Cartesian vector components for the respective aircraft velocities u and v:

$$u := V_A \cdot \begin{pmatrix} \sin(\phi_A) \\ \cos(\phi_A) \end{pmatrix}$$

$$v := V_B \cdot \begin{pmatrix} \sin(\phi_B) \\ \cos(\phi_B) \end{pmatrix}$$

which for the nearby plane 46 provided above gives:

$$v = \begin{pmatrix} 218.888 \\ 73.369 \end{pmatrix}$$

and for the survey aircraft 42 given above gives:

$$u = \begin{pmatrix} -19.653 \\ 111.458 \end{pmatrix}$$

The position vector of the survey aircraft 42 can be represented parametrically as a function of time t in the form:

$$P_A(t) := P_A + t \cdot k \cdot u$$

where $P_A$ is the position vector corresponding to the current position of the survey aircraft 42, $P_A(t)$ is the position vector corresponding to the position of the survey aircraft 42 at time t, and k is a speed factor representing modification of the velocity of the survey aircraft 42.

The position vector of the nearby aircraft 46 is similarly parametrically represented but the nearby aircraft 46 is assumed to be flying at constant velocity so no speed factor is required:

$$P_B(t):=P_B+t\cdot v$$

where $P_B$ is the position vector corresponding to the current position of the nearby aircraft 46, and $P_B(t)$ is the position vector corresponding to the position of the nearby aircraft 46 at time t.

The initial distance between the survey aircraft 42 and the nearby aircraft 46 is given by:

$$w_0:=P_A(0)-P_B(0)$$

and the parametric form of the distance vector is:

$$w(t,k):=w_0+t\cdot(k\cdot u-v)$$

The magnitude of the distance vector is therefore:

$$d(t,k):=|w(t,k)|$$

Defining:

$$D(t,k):=d(t,k)^2$$

gives:

$$D(t,k)=(k\cdot u-v)\cdot(k\cdot u-v)\cdot t^2+2\cdot w_0\cdot(k\cdot u-v)\cdot t+w_0\cdot w_0$$

Since d(t,k) is a minimum when D(t,k) is also a minimum, the minimum d(t,k) is found by solving:

$$0 = \frac{d}{dt}D(t,k) = 2\cdot t\cdot[(k\cdot u - v)\cdot(k\cdot u - v)] + 2\cdot w_0\cdot(k\cdot u - v)$$

This provides a solution for t and a given k at the Closest Point of Approach (CPA):

$$t_{CPA}(k) := \frac{-w_0\cdot(k\cdot u - v)}{(|k\cdot u - v|)^2}$$

and a solution for the distance (designated $d_{CPA}$) between the aircraft at the CPA by substituting $t_{CPA}$ back into d(t,k).

In the present example, with k=1 (no modification of survey aircraft speed), the distance at the CPA is 11.084 NM. That is, for k=1:

$$d(t_{CPA}(k),k)=11.084 \text{ NM}$$

As illustrated in FIG. 5, the varying length of the distance vector d(1), d(2) and d(3) at respective times t=1, 2 and 3 show that converging aircraft move towards a minimum distance $d(t_{CPA})$ at $t_{CPA}$ then diverge. If $t_{CPA}$ is a negative number, then the aircraft are diverging, that is, the CPA occurs in the past.

If the minimum distance $d(t_{CPA})$ is less than the minimum separation distance then the survey aircraft speed must be altered in order to cause an increase in the determined minimum distance $d(t_{CPA})$ to greater than the required minimum separation distance.

The required survey aircraft speed to achieve this is calculated iteratively by the target speed calculator 38 by varying the speed factor k until an aircraft velocity value is produced that provides a required separation distance $d(t_{CPA})$ at the CPA distance that is greater than the minimum separation distance.

After the target speed is calculated by the target speed calculator 38, the target speed is displayed or otherwise communicated to the aircraft operator, and the aircraft operator modifies the speed of the aircraft to match the target speed.

In this way, during a survey a LOS situation is avoided and the likelihood of the survey aircraft receiving an instruction from traffic control to take evasive action, such as change course, is much reduced.

It will be appreciated that since the survey aircraft is unlikely to receive an instruction from traffic control to take evasive action, the likelihood that the survey aircraft will be required to divert from a planned survey line is also much reduced.

Figure 6:
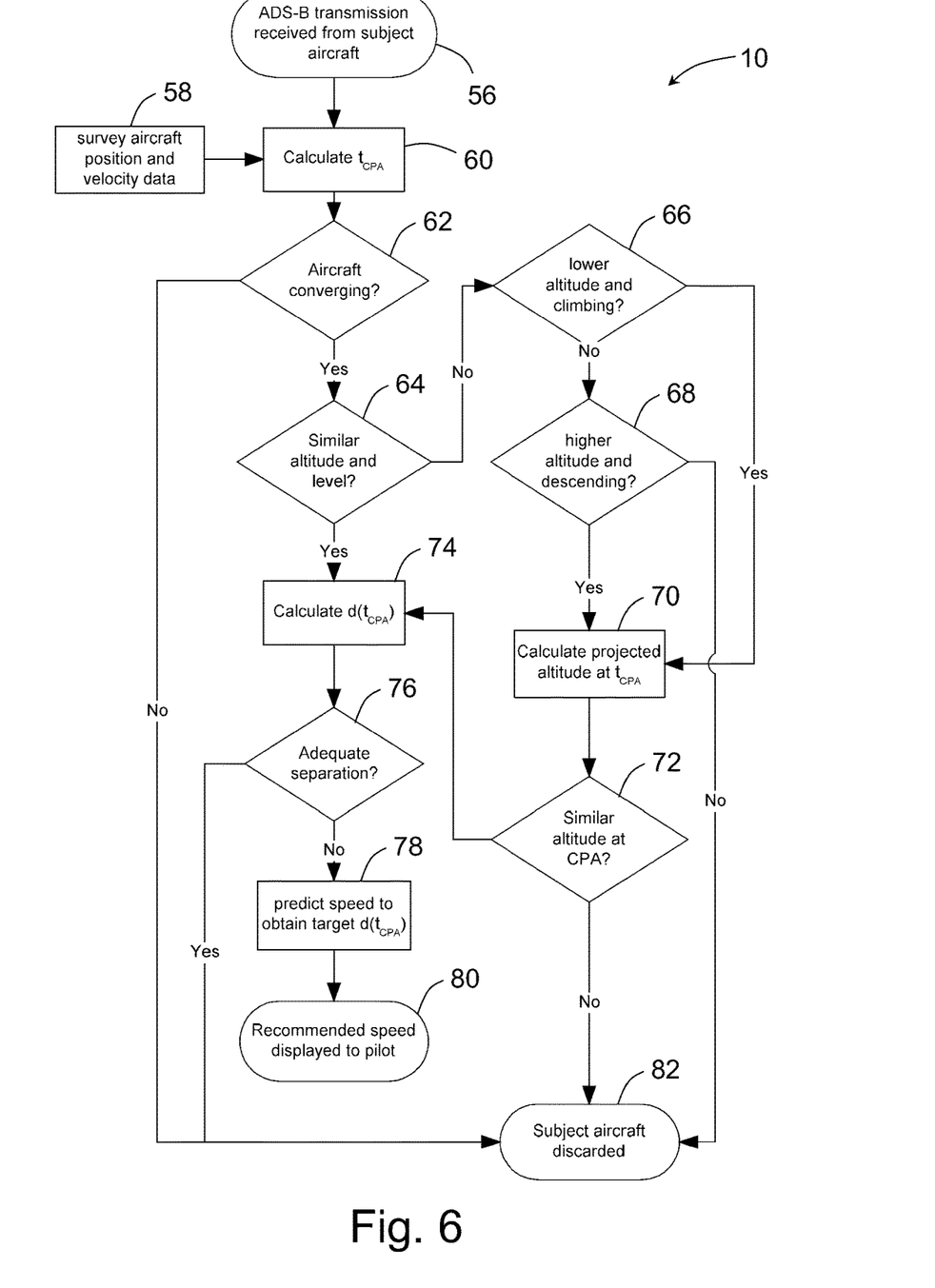
FIG. 6 is a flow diagram illustrating a method of avoiding a loss of separation (LOS) between a survey aircraft and an aircraft located in the vicinity of the survey aircraft.

Referring to FIG. 6, a flow diagram 54 is shown that illustrates steps 56-82 of a method of avoiding a loss of separation (LOS) between a survey aircraft and an aircraft located in the vicinity of the survey aircraft.

At steps 56, 58 and 60, the time ($t_{CPA}$) to the CPA distance is calculated and based on the calculated $t_{CPA}$ value a determination is made as to whether the survey aircraft and the nearby aircraft are converging or diverging, for example based on whether the calculated time $t_{CPA}$ is positive or negative. If the two aircraft are diverging 62, then the nearby aircraft is discarded 82.

If however the two aircraft are converging 62, and the two aircraft are at a similar altitude and maintaining the same altitude 64, then the distance ($d_{CPA}$) between the aircraft at the CPA distance is calculated 74 and compared with the minimum separation distance 76. If adequate separation exists, then the nearby aircraft is discarded 82. If the distance ($d_{CPA}$) between the aircraft at the CPA distance is inadequate 76, then a new speed for the survey aircraft is calculated 78 that corresponds to a distance ($d_{CPA}$) between the aircraft at the CPA distance greater than the minimum separation distance, and the new speed is communicated to the pilot of the survey aircraft.

If the two aircraft are converging 62, and the two aircraft are at different altitudes but moving towards each other, then the projected altitude at the CPA distance is calculated 70. If the two aircraft will have a similar altitude at CPA 72, then the distance ($d_{CPA}$) between the aircraft at the CPA distance is calculated 74.

As above, if adequate separation exists, then the nearby aircraft is discarded 82. If the distance ($d_{CPA}$) between the aircraft at the CPA distance is inadequate 76, then a new speed for the survey aircraft is calculated 78 that corresponds to a distance ($d_{CPA}$) between the aircraft at the CPA distance greater than the minimum separation distance, and the new speed is communicated to the pilot of the survey aircraft.

Figure 7:
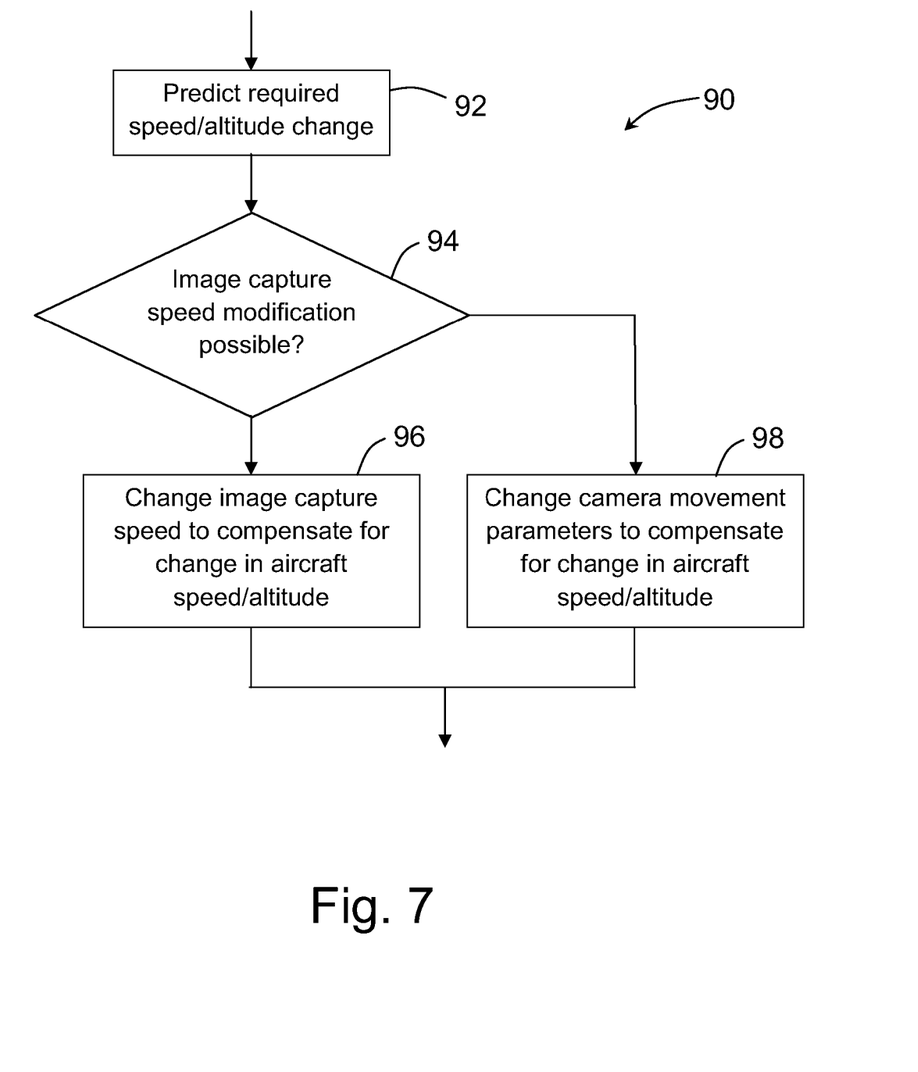
FIG. 7 is a flow diagram illustrating a method of substantially maintaining survey efficiency notwithstanding changes in aircraft navigation parameters.

If the two aircraft will not have a similar altitude at CPA 72, then the nearby aircraft is discarded 82. Referring to FIG. 7, a flow diagram 90 is shown that illustrates steps 92-100 of an example method of substantially maintaining survey efficiency notwithstanding changes in aircraft navigation parameters.

The flow diagram 90 relates to a camera system that includes a camera assembly arranged to sweep transversely as images are captured, and modifiable camera parameters include timing of image capture, speed of sweep of the camera assembly, and range of sweep of the camera assembly. However, it will be understood that the present system and method is applicable to other camera systems that have other modifiable camera parameters that affect survey efficiency, in particular the number and quality of images produced and/or efficiency of image processing.

At step 92, the required speed or altitude change to the survey aircraft is predicted, for example according to the flow diagram 54 shown in FIG. 6, and at step 94, the camera parameter modifier 17 makes a determination as to whether modification of the image capture rate is possible in order to at least substantially maintain survey efficiency. If so, then the image capture speed is modified 96 to compensate for changes in aircraft speed or altitude. If not, then other camera parameters are modified, in this example the sweep speed or sweep range of the camera assembly 41.

As an alternative, both the image capture speed and at least one other camera parameter may be modified 96 to compensate for changes in aircraft speed or altitude.

With a survey aircraft provided with a camera system that includes a camera assembly arranged to sweep transversely as images are captured, if the sweep range is reduced or increased in response to a change in navigation parameters of the survey aircraft, this may result in an asymmetrical footprint of captured images. In order to compensate for this, the system may be arranged to increase the sweep range on the next flight line at a location corresponding to the reduction in sweep range, or the subsequent flight line spacings could be adjusted to ensure that a minimum desired overlap exists.

In an alternative example, instead of speed, the altitude of the survey aircraft is increased or decreased in response to an expected LOS situation. If the altitude is increased, the effective resolution of captured images decreases and the overlap between adjacent images increases. In order to maintain the image overlaps substantially the same, the camera parameter modifier 17 may reduce the speed of capture of images and/or reduce the sweep time (if the camera assembly is arranged to sweep transversely as images are captured). Optionally, the flight speed may also be increased so that the camera is operating at optimum speed.

If the altitude is decreased, the effective resolution of captured images increases and the overlap between adjacent images decreases. In order to maintain the image overlaps substantially the same, the camera parameter modifier 17 may increase the speed of capture of images and/or increase the sweep time (if the camera assembly is arranged to sweep transversely as images are captured).

In a further alternative example, if instead of modifying survey aircraft speed and/or altitude to compensate for a predicted LOS situation, the aircraft course is modified then, if possible, appropriate modifications to camera system parameters may be made to at least partially compensate for the effect on survey efficiency due to change in survey aircraft direction.

For example, in response to a change in aircraft direction, the camera system may be controlled so as to move in an asymmetrical swathe, or to increase the sweep range, in order to maintain side overlap between adjacent images, or the aircraft speed may be reduced in order to provide increased scanning time.

In a particular example, an aerial survey image capture system is mounted on a survey aircraft. The aerial survey image capture system includes a camera system mounted on an underside part of the aircraft and arranged so that a field of view of at least one fixed frame camera extends downwardly of the aircraft towards the ground. The camera assembly includes forward track optical compensation that at least partially compensates for movement of the aircraft during image capture, for example a mirror arranged to rotate about a transverse axis at a speed corresponding to the speed of the aircraft.

In this example, the focal length of each fixed frame camera is 300 mm, and 12,000×12,000 pixel images are taken with 80% forward overlap and 65% side overlap during normal operation. The along track field of view of an image footprint of each camera is 11.421°.

In this example, each camera is essentially fixed in that it is not arranged to move as images are captured, for example the camera does not sweep transversely as images are captured, and the aircraft is flown at an altitude of 15,000 feet (4.572 km).

The relationship between the camera cycle time (the camera shot rate), the aircraft speed and the forward overlap % is determined according to the following formula:

$$Tcycle = 2 * \text{TAN}\left(\frac{FoV}{2}\right) * A * \frac{1-O}{V} \tag{1}$$

where $T_{cycle}$ is the camera shot rate in seconds, FoV is the along track field of view of an image footprint in degrees, A is the altitude of the aircraft in metres, and O is the forward overlap (%) of adjacent captured images.

Using this formula, it can be seen that at an aircraft speed of 150 ktas (77.167 m/s), the required camera shot rate for a forward image overlap of 80% is 2.37 s; at an aircraft speed of 200 ktas (102.89 m/s), the required camera shot rate for a forward image overlap of 80% is 1.78 s; and at an aircraft speed of 250 ktas (128.61 m/s), the required camera shot rate for a forward image overlap of 80% is 1.42 s.

Therefore, using the above formula, and based on a defined target overlap between adjacent captured along track images, it is possible to substantially maintain the along track overlap by modifying the camera shot rate in response to modification of aircraft speed.

In a further example, an aerial survey image capture system includes a camera system mounted on an underside part of the aircraft and arranged so that a field of view of at least one camera extends downwardly of the aircraft towards the ground. The camera assembly includes forward track optical compensation that at least partially compensates for movement of the aircraft during image capture, for example a mirror arranged to rotate about a transverse axis at a speed corresponding to the speed of the aircraft. The camera assembly is also arranged to scan across track so as to capture multiple images in a transverse direction as the aircraft travels forwards.

The relationship between the number of shots taken across track in each scan, the camera cycle time (the camera shot rate), the step time between shot positions in milliseconds, and the dwell time for exposure at each shot position in milliseconds is determined according to the following formula:

$$Nshots = \text{FLOOR}\left(Tcycle * \frac{1000}{Tstep + Tdwell}\right) \tag{2}$$

where $T_{cycle}$ is the camera shot rate in seconds, $N_{shots}$ is the number of shots in each scan across track, $T_{step}$ is the step time between shot positions, and $T_{dwell}$ is the dwell time for exposure at each shot position.

Using formula (1) above, it can be seen that at an aircraft speed of 150 ktas (77.167 m/s), the required camera shot rate for a forward image overlap of 80% is 2.37 s. Based on a minimum $T_{step}$ (that limits velocity, acceleration or jerk on the scanning system) of 50 ms and a minimum $T_{dwell}$ (based on shutter/exposure time, and any time required for the system to "settle" after a step) of 25 ms, and using formula (2) above, 31 shots should be taken across track.

Similarly, at an aircraft speed of 200 ktas (102.89 m/s), the required camera shot rate for a forward image overlap of 80% is 1.78 s. Based on a minimum $T_{step}$ of 50 ms and a minimum $T_{dwell}$ of 25 ms, and using formula (2) above, 23 shots should be taken across track.

Similarly, at an aircraft speed of 250 ktas (128.61 m/s), the required camera shot rate for a forward image overlap of 80% is 1.42 s. Based on a minimum $T_{step}$ of 50 ms and a minimum $T_{dwell}$ of 25 ms, and using formula (2) above, 18 shots should be taken across track.

Accordingly, a survey aircraft may operate at a cruising speed of 200 ktas (for minimum fuel burn), taking 23 shots across track. If it is necessary to increase the speed of the aircraft in order to avoid a LOS situation, for example to 250 ktas, the number of shots taken is reduced in this example to 18. The scan direction may also be offset slightly to one side so as to maintain overlap with existing captured imagery.

On the next flight line, at a location corresponding to the location at which the number of shots taken was reduced, the aircraft speed may be reduced to 150 ktas to and the number of shots taken across track increased to 31, also offset to one side. In this way, a degree of compensation is provided in order to maintain desired overlap & coverage, without having to adjust flight lines, or re-fly a line.

Modifications and variations as would be apparent to a skilled addressee are deemed to be within the scope of the present invention.

The claims defining the invention are as follows:

1. An aerial survey image capture system for a survey aircraft navigable using navigation parameters that include altitude, speed and direction, the system comprising:
   a camera system arranged to capture successive images of ground beneath a survey aircraft as the survey aircraft travels on a defined flight path;
   the camera system having associated camera parameters indicative of image capture characteristics of the camera system including defined image overlap between captured images;
   the defined flight path and the camera parameters being such that sufficient multiple images are obtained of ground features that a bundle adjustment process can be carried out on the ground images and a photogrammetric solution produced based on the images;
   the aerial survey image capture system comprising:
      a loss of separation (LOS) avoidance system for a survey aircraft;
      the LOS avoidance system arranged to:
         receive information indicative of the location and movement of the survey aircraft and to receive information indicative of the location and movement of a nearby aircraft in the vicinity of the survey aircraft;
         determine a predicted closest point of approach (CPA) distance between the survey aircraft and the nearby aircraft based on the received information indicative of the location and movement of the survey aircraft and the information indicative of the location and movement of the nearby aircraft;
         compare the CPA distance with a defined minimum separation distance corresponding to a loss of separation (LOS); and
         determine an estimate for at least one navigation parameter of the survey aircraft that is required for the CPA distance to remain above the defined minimum separation distance; and
   a camera parameter modifier arranged to produce modified camera system parameters in response to the estimated at least one navigation parameter, the modified camera system parameters modifying characteristics of image capture by the camera system so as to substantially maintain the defined image overlap between captured images and thereby at least partially compensate for a change in survey efficiency when the estimated at least one navigation parameter is used to navigate the survey aircraft without modifying the defined flight path.

2. A system as claimed in claim 1, wherein the camera parameter modifier comprises an image capture controller arranged to control the rate of image capture by the camera system so as to at least partially compensate for a change in survey efficiency when the estimated at least one navigation parameter is used to navigate the survey aircraft.

3. A system as claimed in claim 2, comprising an image capture rate calculator arranged to calculate the image capture rate required in order to at least partially compensate for a change in survey efficiency when the estimated at least one navigation parameter is used to navigate the survey aircraft, the image capture rate calculator arranged to provide the image capture controller with the calculated required image capture rate, wherein the image capture rate calculator is arranged to calculate the image capture rate using the following formula:

$$Tcycle = 2 * \mathrm{TAN}\left(\frac{FoV}{2}\right) * A * \frac{1-O}{V}$$

where $T_{cycle}$ is the image capture rate in seconds, FoV is the along track field of view of an image footprint in degrees, A is the altitude of the survey aircraft in meters, and O is the forward overlap (%) of adjacent captured images.

4. A system as claimed in claim 1, wherein the camera parameter modifier comprises a camera movement controller arranged to control movement characteristics of the camera system so as to at least partially compensate for a change in survey efficiency when the estimated at least one navigation parameter is used to navigate the survey aircraft.

5. A system as claimed in claim 4, wherein the camera system includes a camera assembly arranged to sweep as images are captured, and the camera movement controller is arranged to increase or reduce the rate of sweep or the range of sweep of the camera assembly so as to modify the amount of overlap between adjacent captured images when the estimated at least one navigation parameter is used to navigate the survey aircraft.

6. A system as claimed in claim 1, comprising an ADS-B device arranged to receive information indicative of the location and movement of nearby aircraft in the vicinity of the survey aircraft.

7. A system as claimed in claim 6, wherein the ADS-B device is located on the survey aircraft.

8. A system as claimed in claim 7, wherein the ADS-B device is located at a ground location in the vicinity of the survey aircraft.

9. A system as claimed in claim 1, wherein the estimate for the at least one navigation parameter of the survey aircraft that is required for the CPA distance to remain above the defined minimum separation distance is determined at a ground location and wirelessly communicated to the survey aircraft.

10. A system as claimed in claim 1, wherein the system is arranged to calculate the time to the closest point of approach (CPA) distance based on the information indicative of the location and movement of the nearby aircraft and the information indicative of the location and movement of the survey aircraft, and wherein the system is arranged to calculate the closest point of approach (CPA) distance using the calculated time to the closest point of approach (CPA) distance.

11. A system as claimed in claim 1, wherein the system is arranged to display on the survey aircraft or produce audible information indicative of at least one navigation parameter of the survey aircraft that is required for the CPA distance to remain above the defined minimum separation distance.

12. A system as claimed in claim 1, wherein the at least one navigation parameter includes at least one of a speed of travel of the survey aircraft and an altitude of the survey aircraft.

13. A system as claimed in claim 1, wherein the system is arranged to determine whether the survey aircraft and the nearby aircraft are at different altitudes converging towards the same altitude, and if so, the system is arranged to calculate the predicted altitudes of the survey aircraft and the nearby aircraft at the CPA distance.

14. A system as claimed in claim 13, wherein if the altitude of the survey aircraft at the CPA distance and the altitude of the nearby aircraft at the CPA distance are not substantially the same, the system is arranged such that an estimate for the speed and/or direction of travel of the survey aircraft is not determined.

15. A method of capturing aerial survey images in a survey aircraft navigable using navigation parameters that include altitude, speed and direction, the method comprising:
capturing successive images of ground beneath a survey aircraft as the survey aircraft travels on a defined flight path using a camera system, the camera system having associated camera parameters indicative of image capture characteristics of the camera system including defined image overlap between captured images, the defined flight path and the camera parameters being such that sufficient multiple images are obtained of ground features that a bundle adjustment process can be carried out on the ground images and a photogrammetric solution produced based on the images;
receiving information indicative of the location and movement of the survey aircraft;
receiving information indicative of the location and movement of a nearby aircraft in the vicinity of the survey aircraft;
determining a predicted closest point of approach (CPA) distance between the survey aircraft and the nearby aircraft based on the received information indicative of the location and movement of the survey aircraft and the information indicative of the location and movement of the nearby aircraft;
comparing the CPA distance with a defined minimum separation distance corresponding to a loss of separation (LOS);

if the CPA distance is less than the defined minimum separation distance, determining an estimate for at least one navigation parameter of the survey aircraft that is required for the CPA distance to remain above the defined minimum separation distance; and
producing modified camera system parameters in response to the estimated at least one navigation parameter, the modified camera system parameters modifying characteristics of image capture by the camera system so as to substantially maintain the defined image overlap between captured images and thereby at least partially compensate for a change in survey efficiency when the estimated at least one navigation parameter is used to navigate the survey aircraft without modifying the defined flight path.

16. A method as claimed in claim 15, comprising controlling the rate of image capture by the camera system so as to at least partially compensate for a change in survey efficiency when the estimated at least one navigation parameter is used to navigate the survey aircraft.

17. A method as claimed in claim 16, comprising increasing or reducing the rate of image capture by the camera system so as to at least partially compensate for a change in survey efficiency when the estimated at least one navigation parameter is used to navigate the survey aircraft.

18. A method as claimed in claim 15, comprising controlling movement characteristics of the camera system so as to at least partially compensate for a change in survey efficiency when the estimated at least one navigation parameter is used to navigate the survey aircraft.

19. A method as claimed in claim 18, comprising sweeping a camera assembly as images are captured, and increasing or reducing the rate of sweep or the range of sweep of the camera assembly so as to modify the amount of overlap between adjacent captured images when the estimated at least one navigation parameter is used to navigate the survey aircraft.

20. A method as claimed in claim 15, further comprising:
calculating the time to the closest point of approach (CPA) distance based on the information indicative of the location and movement of the nearby aircraft and the information indicative of the location and movement of the survey aircraft; and
calculating the closest point of approach (CPA) distance using the calculated time to the closest point of approach (CPA) distance.

21. A method as claimed in claim 15, wherein the at least one navigation parameter includes at least one of a speed of travel of the survey aircraft and an altitude of the survey aircraft.

22. A method as claimed in claim 15, further comprising:
determining whether the survey aircraft and the nearby aircraft are at different altitudes converging towards the same altitude, and if so, calculating the predicted altitudes of the survey aircraft and the nearby aircraft at the CPA distance; and
determining an estimate for the speed and/or direction of travel of the survey aircraft if the altitude of the survey aircraft at the CPA distance and the altitude of the nearby aircraft at the CPA distance are not substantially the same.

* * * * *

UNITED STATES PATENT AND TRADEMARK OFFICE
CERTIFICATE OF CORRECTION

| | |
|---|---|
| PATENT NO. | : 10,378,895 B2 |
| APPLICATION NO. | : 15/503998 |
| DATED | : August 13, 2019 |
| INVENTOR(S) | : Simon Cope and Michael von Bertouch |

It is certified that error appears in the above-identified patent and that said Letters Patent is hereby corrected as shown below:

On the Title Page

Item (73) Assignee: Delete "Innovagtions" and replace with -- Innovations --

Signed and Sealed this
Second Day of January, 2024

Katherine Kelly Vidal
*Director of the United States Patent and Trademark Office*